L. McL. MONTEATH.
WASHER FOR BOLTS AND THE LIKE.
APPLICATION FILED FEB. 19, 1920.
1,356,873. Patented Oct. 26, 1920.
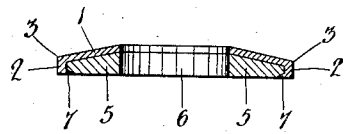
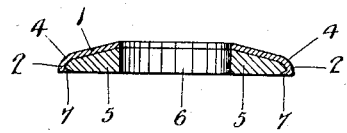
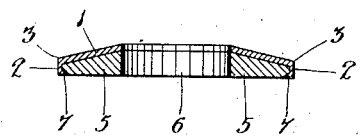
Inventor
L. McL. Monteath
By H. R. Kerslake
Attorney

UNITED STATES PATENT OFFICE.

LAWRENCE McLAURIN MONTEATH, OF NEW PLYMOUTH, NEW ZEALAND.

WASHER FOR BOLTS AND THE LIKE.

1,356,873.  Specification of Letters Patent.  Patented Oct. 26, 1920.

Application filed February 18, 1920. Serial No. 359,534.

*To all whom it may concern:*

Be it known that I, LAWRENCE McLAURIN MONTEATH, a citizen of the Dominion of New Zealand, residing at New Plymouth, New Zealand, have invented certain new and useful Improvements in Washers for Bolts and the like, of which the following is a specification.

This invention relates to washers used upon bolts, screws, studs and the like, and provides a washer which replaces the gromets ordinarily used for preventing the escape of steam, compressed air, water or gas, through the bolt, set screw, or stud opening.

The washer made according to this invention is preferably circular, and is dished or has the shape of a hollow truncated cone, with a rim around the lower edge.

The washer is filled with lead or other similar soft metal, or other substances such as asbestos or manufactured compounds, an internal flange around the rim retaining the soft metal or other substance in the washer.

The pressure caused by screwing a nut against the washer compresses or flattens the latter sufficiently to force the soft metal or substance contained therein, around the bolt, set screw, stud or the like, so as to fill or seal up any cavity or cavities around the bolt, set screw, stud or the like, or in the face against which the washer is forced.

The escape of steam, compressed air, water or gas is thereby prevented.

The invention will be more particularly described with reference to the accompanying drawing, in which:—

Figures 1 to 3 illustrate by means of cross sectional elevations, alternative forms of washers.

In the drawing 1 represents the washer which is preferably circular, and is dished or given the shape of a hollow truncated cone, with a rim 2 around its lower edge.

The rim 2 can vary in thickness as shown in Figs. 1 and 3.

For large bolts and the like and where the bolt, set screw or stud opening is considerably larger than the bolt, set screw or stud passing through same, it is found better to employ a washer 1 having the rim 2 thicker than or at least equal to the thickness of the washer body (Figs. 1 and 2).

On the other hand for small bolts, set screws and studs, and especially where low pressure joints are required to be made, a rim 2 (Fig. 3) thinner than the washer body is sufficient, as the joint is made more easily and more cheaply than where washers with a thick rim are employed.

The washer 1 can be formed with a sharp corner as at 3 Figs. 1 and 3, or with a rounded corner as at 4 Fig. 2, the washer with the rounded corner 4 requiring slightly less filling material than the washer with the sharp corner 3.

The washer is filled with lead, or other soft metal 5, or with asbestos or any other manufactured compound, so as to leave the opening 6 to receive a bolt, set screw, stud or the like, the internal flange 7 around the rim 2 retaining the filling material 5 in the washer.

What I do claim and desire to secure by Letters Patent of the United States is:—

1. A washer for bolts and the like, comprising a hollow truncated cone; and soft metal filled in said washer around the opening therein and having a face extending perpendicularly to the axis of the washer and flush with the base of said cone.

2. A washer for bolts and the like, comprising a hollow truncated cone; an internal flange around the base of said cone; and soft metal filled in said washer around the opening therein and having a face extending perpendicularly to the axis of the washer and flush with the base of said cone.

3. A washer for bolts and the like, comprising a hollow truncated metal cone; a rim around the base of said cone; an internal flange around the lower edge of said rim, and soft metal filled in the cone around the opening therein and having a face extending perpendicularly to the axis of the cone and arranged flush with the base of said flange.

4. A washer comprising a conical metal shell having a central aperture and a peripheral annular flange, and a ring of soft metal engaging the inner wall of the shell and the inner surface of said flange, said ring having a base face arranged substantially flush with the base of said flange.

5. A washer of the kind defined by claim 4 in which the flange extends inwardly toward the axis of the washer for retaining the ring in position.

6. A washer of the kind defined by claim 4 in which the flange extends inwardly toward the axis of the washer for retaining the ring in position, said flange being of less thickness than said shell.

7. A sealing bolt washer comprising a shallow cup shaped shell having an axial aperture and provided with a peripheral axially extending rim, and a ring of soft sealing material filling said shell and having a face arranged in the same place as the outer edge of said rim.

In testimony whereof I affix my signature in the presence of two witnesses.

LAWRENCE McLAURIN MONTEATH.

Witnesses:
CHARLES THOMAS RUNDLE,
EDWARD CLARKE.